United States Patent Office 3,482,647
Patented Dec. 9, 1969

3,482,647
APPARATUS FOR PRECISE SOUND PATH IN VELOCIMETER
Thomas H. Lynch, Canoga Park, and Hudson T. Patten III, Santa Susana, Calif., assignors to The Bunker-Ramo Corporation, Canoga Park, Calif., a corporation of Delaware
Filed Nov. 19, 1968, Ser. No. 777,098
Int. Cl. G10k 11/00
U.S. Cl. 181—0.5                10 Claims

ABSTRACT OF THE DISCLOSURE

Apparatus is disclosed for providing a precise sound path in an instrument for measuring the speed of sound in water and other liquids, and for compensating for changes in the length of spacing rods due to changes in temperature and pressure. The sound path is between a first plate supporting a transducer and a second parallel plate supporting a reflecting target. The space between the plates is established by three rods through-bolted to the plates under tension. The reflecting target, machined from its supporting plate is made of titanium, stainless 316, or other anticorrosive metal, while the spacing rods are made of iron-nickel alloy. Temperature compensation is achieved by making the ratio $C_1:C_2$ of the temperature coefficients $C_1$ and $C_2$ for the rods and reflecting target, respectively, equal to the ratio $L_2:L_1$, where $L_1$ is the length of each rod and $L_2$ is the height of the reflecting target on its supporting plate. Pressure compensation is provided by a sealed compartment in the supporting plate for the reflecting target. That compartment is located directly behind the reflecting target. The wall between the compartment and the target will bow in around the edge thereof under pressure to compensate for changes in the length of the rods due to hydrostatic pressure.

Background of the invention

This invention relates to apparatus for establishing a precise sound path for an instrument adapted to measure the speed of sound in a liquid, and more particularly to temperature and pressure compensation of spacing rods for establishing the sound path for such an instrument. Such an instrument is now generally termed as "velocimeter."

Velocimeters generally employ a transducer to transmit an acoustic signal through water, or other liquid, in response to a pulse derived from a local oscillator. When the acoustic signal is received by the same transducer as a reflected wave from a reflecting target, or by a second transducer in place of the reflecting target, the local oscillator is recycled. The transducer then transmits a second acoustic signal.

The speed of sound in the liquid is proportional to the frequency at which acoustic signals are retransmitted since that will be dependent upon the time required for the acoustic signal to traverse the sound path, plus fixed electronic time delays in receiving and retransmitting the acoustic signal. These electronic time delays present no problem once suitable system organization and electronic circuit designs have been selected. The problem is establishing and maintaining a predetermined path length.

In the past, such instruments adapted to measure the speed of sound in water and other liquids have not been capable of providing long-term accuracies in excess of plus or minus one part in 10,000 due, in part, to the system organization and circuit designs. An improved system organization disclosed in U.S. patent application Ser. No. 776,998, filed concurrently herewith and assigned to the assignee of the present invention enables significantly greater accuracies to be achieved. In any event, however, the overall instrument accuracy is dependent on how accurately the sound path is defined.

It has been standard practice to limit the acoustic path of prior art instruments to approximately 20 cm. which is the minimum path that will enable system errors to be less than 0.002%. A shorter path would increase the ratio of any fixed electronic delay errors in to the acoustic delay time, thereby increasing the system error, and a longer path is undesirable because it would increase the size of the instrument. Accordingly, for an accuracy of plus or minus one part in 50,000, deviation of the path length must be less than 0.002% in environments where the temperature may vary, for example, from 0° to 30° C. and the pressure may be as much as 10,000 to 20,000 p.s.i., or more (i.e., the pressure at the deepest part of the ocean or wherever the instrument may be used, such as for charting depth-sound velocity profiles).

Although the prior art devices have been intended for use in water, it should be understood that the present invention is not limited to that use. In practice, it will find its greatest utility in oceanography, but it may be used to measure the speed of sound in any liquid.

As just noted, a problem with prior art instruments has been providing and maintaining the path length for greater accuracy than about one part in 10,000. In the past, rods used to space support plates for the transducer and target, or second transducer, have been threaded into the support plates. Although such a construction may permit establishing the path length initially with the desired precision, the path length may vary in use due to expansion, or contraction, of the spacing rods and supporting plates with variation in temperature. Hydrostatic compression will also cause variations in the dimensions of those elements which are crucial in establishing the length of the sound path. Corrosion in the threads of the spacing rods may also cause changes in that length.

Summary of the invention

According to the present invention, rigorous definition of the spacing between the support plates for the transmitting transducer and the target or receiving transducer is achieved by providing spacing rods with reduced diameter portions at each end. The reduced diameter portions pass through holes in the plates which are just large enough to receive the reduced diameter portions. Thus the interfaces between the plates and spacing rods are precisely spaced, and the reduced diameter portions are sufficiently long to protrude through the plates. Each reduced diameter portion is threaded to receive a nut in order to secure the plate through which it passes against the well defined shoulder on the central part of the rod. Accordingly, each rod may be said to have opposing "bolt ends" and a common "head," the interfaces between the bolt ends and the common head constituting shoulders which are spaced apart with precision. A spring washer, such as a split-ring lock nut, is placed between the nut and the plate to maintain tension on the bolt end of the rod under all temperature and pressure conditions.

Temperature compensation is achieved by utilizing the differential in the expansion properies of the spacing rods and the reflecting target (or the mounting for the receiving transducer, if a two-transducer system is employed). If the spacing rods have a length $L_1$ and a coefficient of expansion $C_1$, and the reflecting target has a height $L_2$ and a coefficient of expansion $C_2$, temperature compensation is provided by selecting the ratio $L_1:L_2$ equal to the ratio $C_2:C_1$. Thus, temperature compensation depends only upon selecting $L_1$ and $L_2$. The length $L_1$ is accurately defined and maintained by through-bolting the spacing rods as just described. The height $L_2$ is also accurately defined, such as by machining it with precision from its supporting plate.

Pressure compensation, to correct for the shortening of the sound path due to hydrostatic compression of the spacing rods, is accomplished by providing a sealed cylindrical compartment in the supporting plate directly behind a target in the form of a reflecting surface or a mounting for a receiving transducer. The compartment is filled with gas at low pressure, such as air at atmospheric pressure. Under hydrostatic pressure, the wall between the target, or transducer mounting, and the sealed compartment will bow into the lower pressure compartment. The deflection of the central region, which is the only region used for reflecting acoustic signals, or mounting a receiving transducer, is directly proportional to pressure. The transmitting transducer mounted on the other supporting plate is provided with a diaphragmatically sealed compartment behind it. That compartment is suffiiciently large to house the electronic circuits connected to the transducer, and is filled with a non-corrosive, non-conductive liquid in order that pressure on both sides of the transducer be equal without violating the integrity of the electronic circuits.

The novel features that are considered characteristic of this invention are set forth with particularity in the appended claims. The invention will best be understood from the following description when read in connection with the drawings.

Description of the preferred embodiment

Figure 1:
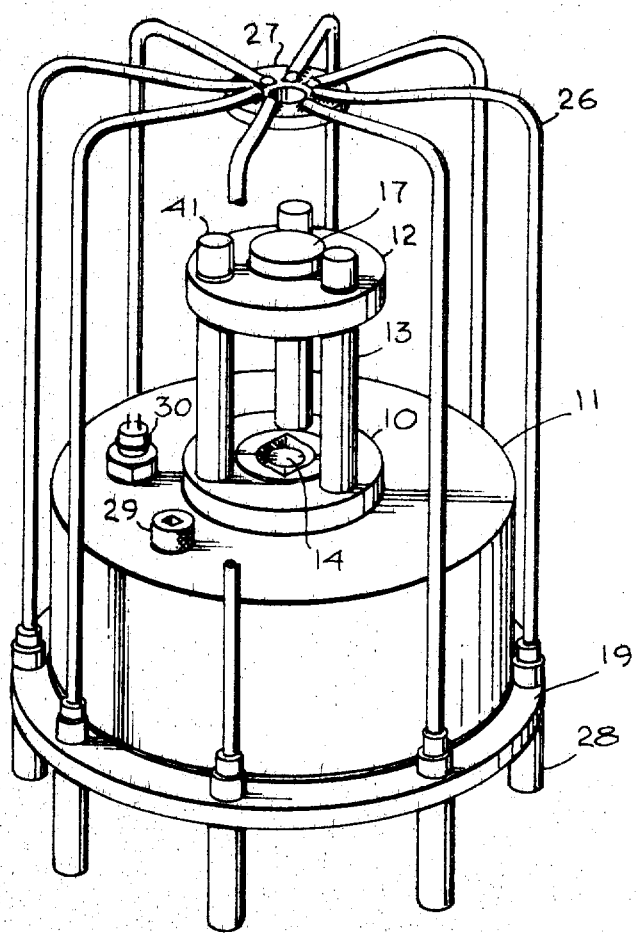
FIGURE 1 is a perspective view of apparatus for establishing a precise sound path for an instrument in accordance with the present invention.
Figure 2:
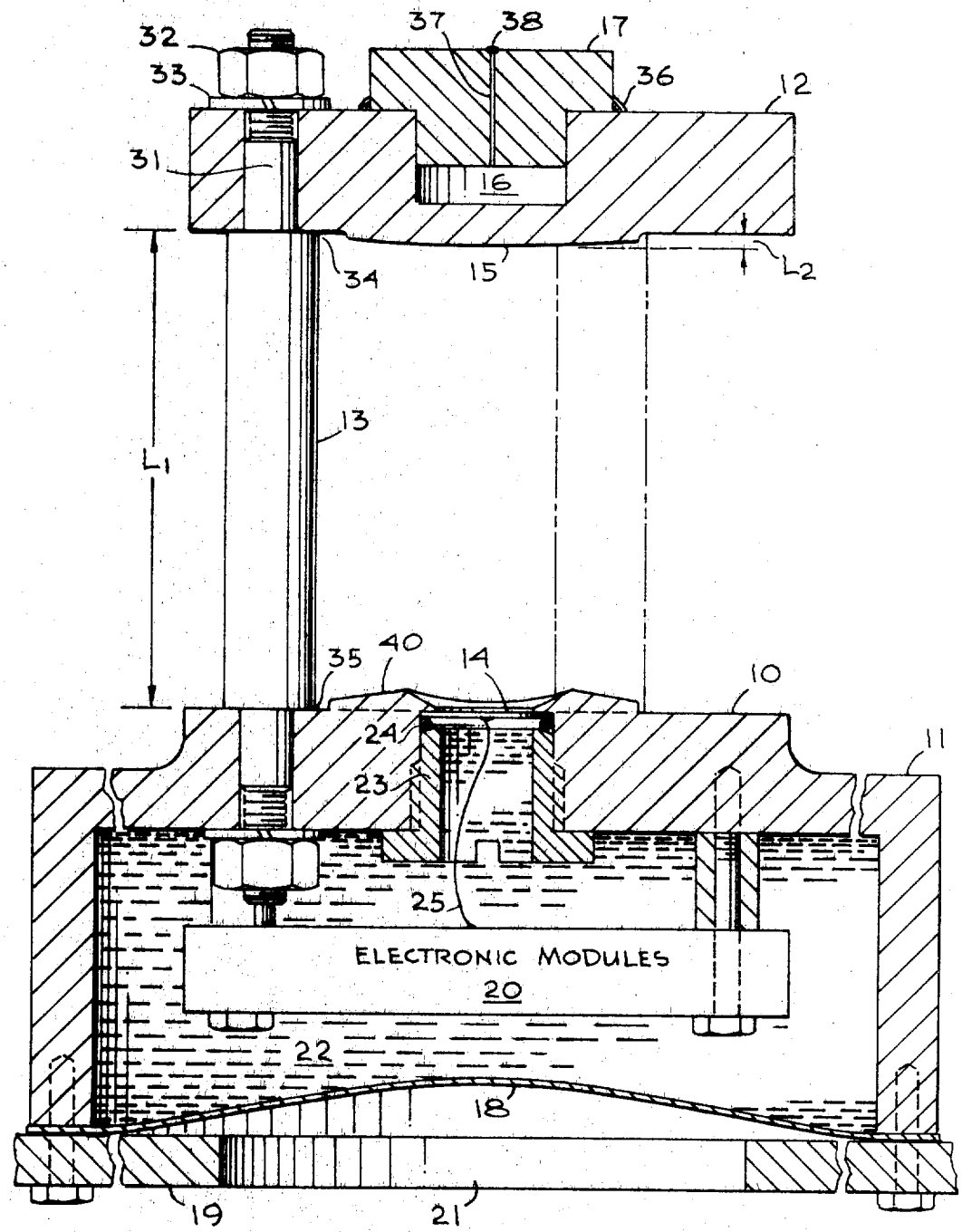
FIG. 2 is a section of the central portion of the apparatus shown in FIG. 1.

In a preferred embodiment of the invention, as shown in FIGS. 1 and 2, a first support plate 10 is machined as an integral part of a housing 11. A second support plate 12 is spaced from the first by three rods, such as rod 13. A transducer 14 comprising a piezoelectric device is mounted at the center of the plate 10 and a reflecting target 15 (FIGURE 2) is machined as an integral part of the plate 12 on the face thereof opposing the plate 10. A pressure compensating compartment 16 (FIG. 2) is machined in the plate 12 from the upper side and sealed by a plug 17. The housing 11 is sealed at the bottom by a rubber diaphragm 18 and an annular plate 19 (FIG. 2).

The housing is sufficiently large to hold all of the electronic circuit modules (indicated generally by a block 20 in FIG. 2). Those modules are required for the transducer 14 to transmit acoustic signals to the target 15. They are also required to receive reflected acoustic signals from the target 15 through the transducer 14, and in response to every other reflected acoustic signal, to recycle an oscillator in one of the electrical modules to re-excite the transducer 14 for the purpose of retransmitting an acoustic signal. The reason for providing electronic circuits which respond to only every other reflected signal is more fully described in the aforesaid copending application. As noted hereinbefore, that system organization enables greater accuracies to be achieved. It has the further advantage of permitting the reflecting target 15 to be spaced from the transducer 14 only 5 cm. apart, as compared to prior art single-transducer systems which required a spacing of 10 cm. for a minimum sound path of 20 cm. Thus, an overall reduction in size is achieved by the single-transducer, double-reflection arrangement.

The housing 11 is filled with a liquid fluorocarbon 22 (or other non-conductive, non-corrosive liquid) in order that under pressure, the diaphragm will bow in as shown and allow the pressure in the housing 11 to equalize with the environmental pressure. In that manner, the pressure on both sides of the transducer 14 is equalized through the center of an annular retaining plug 23. A rubber O-ring 24 provides a seal between the transducer 14 and the retaining plug. The upper outer face of the transducer 14 is silver plated and pressed (grounded) against the plate 10. The center of the lower (inner) face of the transducer 14 is also silver plated in order that an electrical connection may be made to it through a line 25 from one of the electronic modules 20.

Referring to FIG. 1, the plate 18 is of larger diameter than the housing 11 in order to provide a flange through which a plurality of thin rods, such as rod 26, may be bolted. All of these rods are welded to a ring 27 to form a sturdy cage around the precisely spaced plates 10 and 12. A plurality of legs may also be affixed to the bottom of the plate 18, such as the leg 28, in order that some protection be provided for the diaphragm 18 (FIG. 2).

A fill plug 29 is provided on the upper surface of the housing 11 in order to fill the housing with fluorocarbon liquid (or other non-conductive liquid) after the apparatus has been assembled. A standard cable connector 30 is also provided on the upper surface of the housing 11 in order to connect an external source of power supply to the electronic modules 20 (FIG. 2). As described in the aforesaid copending application, operation of the electronic modules is monitored through that power supply cable.

The rods and interfaces between the rods 13 and plates 10 and 12 are coated with a thin film of polyvinyl chloride (or other suitable material to resist corrosion). In addition, the housing 11 and the plate 19, as well as other exposed structural components, except the spacing rods 13, are preferably made of titanium or stainless 316 because of the excellent resistance to general wastage corrosion as well as pitting and crevice corrosion exhibited by those materials.

In order to define and maintain the spacing between the upper surface of the transducer 14 and the surface of the reflecting target 15 at 5 cm., plus or minus a very small tolerance (e.g., one part in 50,000), the spacing rods are provided with a smaller diameter portion at each end such that precision shoulders are provided to space the plates 10 and 12 with the precise spacing desired, as shown in FIG. 2. Each smaller diameter portion passes through a hole in a plate (such as the smaller diameter portion 31 of the rod 13 passing through a hole in the plate 12) and extends through the plate to the other side a sufficient amount to receive a nut 32. The reduced diameter portion 31 is threaded on the end for that purpose. A spring washer 33, such as a split-ring lock washer, is placed between the nut 32 and the plate 12 in order that once the nut 32 has been tightened, the spring force of the washer 33 will maintain tension on the resulting bolt end of the rod 13 under all temperature and pressure conditions. In that manner, once the bolt ends of the rod 13 have been machined with precision to provide properly spaced apart shoulders, the nuts and spring washers maintain a precise interface between the plates and the shoulders such as an interface 34 between the plate 12 and the rod 13.

Since the spacing rods will expand, or contract, with changes in environmental temperature, compensation is provided to maintain the spacing between the upper face of the transducer 14 and the face of the reflecting target 15 fixed to within one part in 50,000. This temperature compensation is achieved by using a cold worked iron-nickel alloy (36% Ni) or other suitable metal for the spacing rods through-bolted to both the plate 10 (which is an integral part of the housing 11) and the target supporting plate 12. As noted hereinbefore, this through-bolting maintains rigorous definition of the interface between the spacing rods and the plates 10 and 12.

To complete the arrangement for temperature compensation, the reflecting target 15 is supported on the plate 12 with the reflecting surface a predetermined height $L_2$ above the interface 34 while the spacing between the interface 34 and an interface 35 at the other end of the rod 13 is $L_1$. Temperature compensation is achieved by selecting the length $L_1$ of the rod 13 and the height $L_2$ of the reflecting target material such that the ratio $L_2:L_1$ is equal to the ratio $C_1:C_2$, where $C_1$ and $C_2$ are the temperature coefficients of the metals from which the respective rods and the reflecting target are made. This is so because the precise spacing between the upper surface of the transducer 14 and the reflecting surface of the target 15 is given by the equation:

$$L_1 - L_2 = L \qquad (1)$$

The dimensions $L_1$ and $L_2$ will vary as a function of temperature T in accordance with the following equations:

$$L_1 = L_1 + C_1 T L_1 \qquad (2)$$

$$L_2 = L_2 + C_2 T L_2 \qquad (3)$$

Substituting for $L_1$ and $L_2$ in Equation 1 the values given by the Equations 2 and 3 will provide the following equation:

$$L_1 + C_1 T L_1 - L_2 - C_2 T L_2 = L \qquad (4)$$

since the desired dimension L is equal to $L_1$ plus $L_2$, the Equation 4 may be reduced to the form:

$$C_1 T L_1 - C_2 T L_2 = 0 \qquad (5)$$

Thus for perfect temperature compensation, the ratio of $C_1$ to $C_2$ must equal the ratio of $L_2$ to $L_1$. By knowing the temperature coefficients $C_1$ and $C_2$, the dimensions $L_2$ and $L_1$ may be readily determined.

Although in this preferred embodiment of the present invention, the reflecting target 15 is machined as an integral part of the plate 12, it should be understood that it could be machined from another block of material and secured to the plate 12. However, that would then present the problem of rigorously defining and maintaining the interface between the target 15 and the supporting plate 12. Accordingly, the target 15 is made from the same block of material as the plate 12. Since iron-nickel alloy (36% Ni) has a temperature coefficient of 0.9 p.p.m./° C. and the temperature coefficient of titanium is 9.8 p.p.m./° C. the ratio of $C_1$ to $C_2$ is defined accordingly when those metals are selected.

Because the dimensions $L_1$ and $L_2$ will vary under hydrostatic pressure, the sealed cylindrical compartment 16 is provided behind the reflecting target 15 for pressure compensation. As noted hereinbefore, that compartment is provided by machining a cylindrical recess or blind hole into the plate 12 and sealing it with the plug 17. An airtight seal is then provided by a weld 36 around the plug 17 at the interface of the plate 12 with a flange on the plug 17. A port 37 is provided through the center of the plug 17 in order that the sealed compartment 16 may be filled with a gas at a low pressure, such as air at atmospheric pressure. The port 37 is then sealed by the weld 38. Thereafter, under hydrostatic pressure, the wall between the reflecting target 15 and the sealed compartment 16 will bow into the lower pressure area of the compartment 16. In that manner, deflection of the central portion of the reflecting target 15 (which has a flat face parallel to the interface 34 of the supporting rod 13) is directly proportional to pressure. That deflection per p.s.i. is given by the following equation:

$$D = Ca^4/t^3 \qquad (6)$$

where C is a constant depending upon the material of the reflecting target 15, $a$ is the radius of the cylindrical compartment 16 and $t$ is the thickness of the wall.

Equation 6 is a simplification of a formula given by S. Timoshenko in Theory of Plates and Shells published by McGraw-Hill (1940). It defines deflection at the center of a uniformly loaded disc of uniform thickness $t$ when it is fixed around its complete circumference. That formula is as follows:

$$Y = \frac{3W(m^2-1)a^2}{16\pi E M^2 t^3} \qquad (7)$$

In Equation 7, Y is deflection in the central portion of the disc corresponding to D of Equation 6, $m$ is the reciprocal of Poissons' ratio, E is Young's modulus, and W is equal to $\omega \pi a^2$. The simplification of Equation 6 over Equation 7 is obviously lumping all of the constant ($m$, E, $\omega$, $\pi$ etc.) in the one constant C. As noted hereinbefore, the target 15 is a very shallow frustum so that the "disc" being deflected under pressure is not of uniform thickness, but the difference is so slight that it may be considered to be so.

This pressure or compression compensation is necessary for use in deep oceans where pressures may be as much as 10,000 to 20,000 p.s.i., or more. Under hydrostatic pressure, the spacing rods will compress and shrink in length. The compression will depend upon the bulk modulus B of the material. Iron-nickel alloy has a higher B, and in fact the highest B of the low expansivity metals. However, it may be shown that unless compensated such an alloy will introduce a time error of 26.1 nanoseconds ±2% at a pressure change of 10,000 p.s.i. in an instrument having a total sound path of 20 cm. with a wave length of .429 millimeter and a time per cycle of 280 nanoseconds. This error, though small, is unacceptable. The pressure compensating means will reduce the error for a system accuracy of better than plus or minus one part in 50,000.

It should be noted that the wall between the reflecting target 15 and the sealed compartment 16 will bow primarily in the thinner portion which is around the edge of the compartment 16. It should be further noted that when the wall is bowed, the space adjustment, which is proportional to pressure up to the elastic limit of the material, is in the order of 0.036 mm./10,000 p.s.i. to compensate an iron-nickel alloy and titanium system. Thus, the wall between the reflecting target 15 and the compartment 16 is not bowed sufficiently to significantly alter the shafe of the reflecting portion of the target which, as noted hereinbefore, is preferably a flat plane parallel to the interface 34. It should be further noted that this inverted frustum shape for the reflecting target reduces stray reflections in the sound path by spreading them out from the desired sound path.

A raised border 40 around the transducer 14 is similarly designed to reduce stray reflections. The raised border is first machined to provide a shallow frustum thereon. A bore is drilled with a diameter slightly less than the diameter of the transducer 14 (which is a thin ceramic disc that exhibits a piezoelectric effect) so that it may be secured in place by the retaining plug 23 and O-ring 24. The bore is then counterbored and threaded for the plug 23 on one (inner) side and countersunk on the other (outer) side to provide a funnel shaped enlargement that assists in directing transmitted sound waves towards the center of the reflecting target 15 while the surrounding surface of the shallow frustum reduces stray reflections in the sound path.

Figure 4:
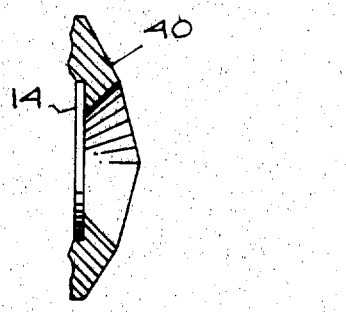
FIG. 4 is a section of the border shown in FIG. 3 taken on a line 4—4 thereof.
Figure 3:
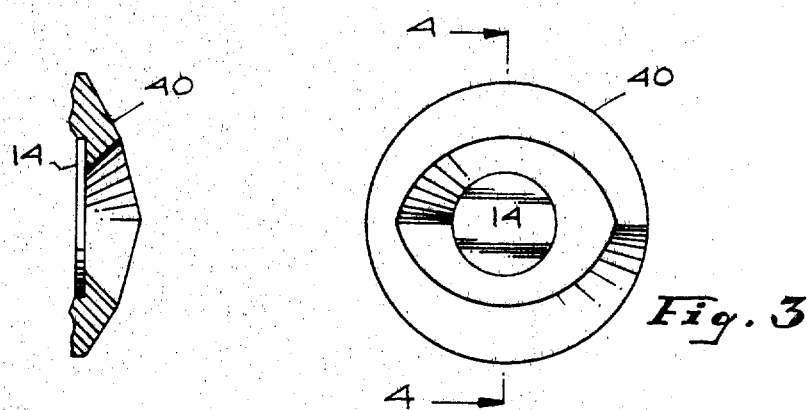
FIG. 3 is a plan view of a raised border around a transducer mounted on a plate in the apparatus of FIG. 1.

The effects of stray reflections is manifested by erratic misfiring of the transducer 14 for retransmission of an acoustic signal because stray reflections produce a preceding soundwave in the second reflected signal. The border 40 formed in the manner described minimizes the effects of stray reflections, but such a shape does not completely eliminate stray reflections. To further reduce stray reflections in the sound path between the transducer 14 and target 15, the border 40 is "roof topped." That is done by cutting the face thereof at a shallow angle on each side of a diameter as shown in FIG. 3. The result is a border with a section as shown in FIG. 4 taken on the line 4—4 of FIG. 3, to symmetrically slant each half of the circular ridge away from that diameter. A section of the border 40 taken on the diameter thereof is shown in FIG. 3. The result of this geometry for the border 40 is a decrease in the effects of stray reflections by more than 6 db.

To complete the assembly, the exposed nuts, washers and threaded ends of the spacing rods, such as the nut 32 threaded on spacing rod 13 over the spring washer 33, are covered with a protecting plastic cap 41 (FIG. 1). The cap is first filled almost to the brim with a suitable epoxy material and then seated over the nut and washer. Excess epoxy material flows out and what remains fills and adhesively holds the cap in place.

It should be appreciated that the invention is in no sense dependent upon any particular fabrication technology. Accordingly, inasmuch as it is recognized that modifications and variations falling within the spirit of the invention will occur to those skilled in the art, it is not intended that the scope of the invention be determined by the exemplary embodiment disclosed.

The embodiments of the invention in which an exclusive property or privilege is claimed are defined as follows:

1. In apparatus for providing a precise sound path between a transducer and a target supported on first and second plates, respectively, spaced apart by rods, means for automatically compensating for variations in the length $L_1$ of said spacing rods due to changes in temperature comprising supporting said target at a distance $L_2$ from said second plate by material having a coefficient of expansion $C_2$ when a given spacing rod has a length $L_1$ and is made of a material having a coefficient of expansion $C_1$, the ratio of said height $L_2$ to said length $L_1$ being selected to be substantially equal to the ratio of said coefficient of expansion $C_1$ to said coefficient of expansion $C_2$.

2. In apparatus for providing a precise sound path between a transducer and a target supported on plates spaced apart by rods, means for compensating for variations in the length of said spacing rods due to changes in environmental pressure comprising a sealed compartment in one of said plates directly behind said target, said compartment being filled with a gas at low pressure, and being separated from said target by a thin wall.

3. Apparatus as defined in claim 2 wherein said compartment is cylindrical with its axis parallel to said sound path, and the thickness $t$ of said thin wall is given by the following equation:

$$D = Ca^4/t^3$$

where D is the wall deflection required per units of force per unit of area to compensate for sound path shortening due to hydrostatic compression of said rods, C is a constant which depends upon the material of said thin wall, and $a$ is the radius of said compartment.

4. A velocimeter including means providing a precise sound path between a transducer and a target comprising:
a first plate for supporting said transducer and having a plurality of spaced holes extending therethrough;
a second plate for supporting said target and having a plurality of spaced holes extending therethrough corresponding to said spaced holes in said first plate;
a plurality of spacing rods, one associated with each hole through said first plate, each of a diameter greater than the associated hole in said first plate and the corresponding hole in said second plate, both ends of a given rod having a smaller diameter portion, one end passing through its associated hole of said first plate and the other end passing through a corresponding hole of said second plate, said rod thereby having a shoulder at both ends where smaller diameter portions interface with a central portion, the shoulders on each end of a given rod being spaced apart with a degree of precision commensurate with the precision desired in the length of said sound path; and
means for maintaining under tension all smaller diameter portions passing through holes of said first and second plates by pressing said first and second plates against said shoulders and pulling said smaller diameter portions through said holes in said plates.

5. Apparatus as defined in claim 4 wherein
said second plate is provided with a sealed compartment filled with a gas at low pressure, said compartment being directly behind said target in said sound path and separated therefrom by a thin wall to compensate for variation in the length of said spacing rods due to changes in environmental pressure.

6. Apparatus as defined in claim 5 wherein
said compartment is cylindrical with its axis parallel to said sound path, and the thickness $t$ of said thin wall is given by the following equation:

$$D = Ca^4/t^3$$

where D is the wall defletcion required per units of force per unit of area to compensate for sound path shortening due to hydrostatic compression of said rods, C is a constant which depends upon the material of said thin wall, and $a$ is the radius of said compartment.

7. Apparatus as defined in claim 4 wherein
the sound path defining surface of said target is supported on said second plate at a height $L_2$ by material having a coefficient of expansion $C_2$ and said given spacing rod has a length $L_1$ and is made of a material having a coefficient of expansion $C_1$, the ratio of said height $L_2$ to said length $L_1$ being selected to be equal to the ratio of said coefficient of expansion $C_1$ to said coefficient of expansion $C_2$, whereby compensation for variation in the length $L_1$ due to temperature changes is provided.

8. Apparatus as defined in claim 7 wherein
said second plate is provided with a sealed compartment filled with a gas at low pressure, said compartment being directly behind said target in said sound path and separated therefrom by a thin wall to compensate for variation in the length of said spacing rods due to changes in environmental pressure.

9. Apparatus as defined in claim 8 wherein
said compartment is cylindrical with its axis parallel to said sound path, and the thickness $t$ of said thin wall is given by the following equation:

$$D = Ca^4/t^3$$

where D is the wall deflection required per units of force per unit of area to compensate for sound path shortening due to hydrostatic compression of said rods, C is a constant which depends upon the material of said thin wall, and $a$ is the radius of said compartment.

10. Apparatus as defined in claim 4 wherein said tensioning means comprises:
separate spring washers around both ends of said given spacing rod, a first washer over said first plate at one end of said given spacing rod and a second washer over said second plate at the other end of said given spacing rod; and
separate nuts threaded on both ends of said given spacing rod, one nut over said first washer at one end of said given spacing rod and one nut over said second washer at the other end of said given spacing rod.

References Cited
UNITED STATES PATENTS 3,098,211   7/1963   Gerber _____ 101—0.5

RODNEY D. BENNETT, Jr., Primary Examiner

C. E. WANDS, Assistant Examiner